(12) United States Patent
Buttars

(10) Patent No.: US 9,169,948 B2
(45) Date of Patent: Oct. 27, 2015

(54) SUPPORT STRUCTURES FOR ELECTRICAL AND PLUMBING SYSTEMS

(71) Applicant: David Jay Buttars, Smithfield, UT (US)

(72) Inventor: David Jay Buttars, Smithfield, UT (US)

(\*) Notice: Subject to any disclaimer, the term of this patent is extended or adjusted under 35 U.S.C. 154(b) by 0 days.

(21) Appl. No.: 14/250,318

(22) Filed: Apr. 10, 2014

(65) Prior Publication Data
US 2014/0332637 A1 Nov. 13, 2014

Related U.S. Application Data

(60) Provisional application No. 61/822,899, filed on May 13, 2013.

(51) Int. Cl.
*F16L 3/12* (2006.01)
*F16L 3/08* (2006.01)
*E04C 2/08* (2006.01)
*H02G 3/12* (2006.01)
*F16L 3/22* (2006.01)
*E04C 2/52* (2006.01)
*E03C 1/02* (2006.01)

(52) U.S. Cl.
CPC .............. *F16L 3/1218* (2013.01); *E03C 1/021* (2013.01); *E04C 2/08* (2013.01); *E04C 2/521* (2013.01); *F16L 3/08* (2013.01); *F16L 3/22* (2013.01); *H02G 3/125* (2013.01); *E03C 2001/028* (2013.01)

(58) Field of Classification Search
CPC ..... F16L 3/1207; F16L 3/1218; F16L 3/1233; F16L 3/22; H02G 3/125; H02G 3/126; E03C 1/021; E03C 2001/028; E04C 2/08; E04C 2/521

USPC .............. 248/56, 57; 52/220.1, 232, 317; D8/373; 428/596, 598, 603, 542.8; 174/668, 669
See application file for complete search history.

(56) References Cited

U.S. PATENT DOCUMENTS

| | | | | | |
|---|---|---|---|---|---|
| 332,491 | A | * | 12/1885 | Clay | 52/630 |
| 1,867,449 | A | * | 7/1932 | Ecket et al. | 52/100 |
| 2,103,064 | A | * | 12/1937 | Clark | 52/696 |
| 2,628,799 | A | * | 2/1953 | Aaby | 248/57 |
| 2,661,483 | A | * | 12/1953 | Tortorice | 4/695 |
| 2,994,114 | A | * | 8/1961 | Black | 52/317 |
| 3,606,217 | A | * | 9/1971 | Leiferman | 4/695 |
| 4,550,451 | A | * | 11/1985 | Hubbard | 4/695 |
| D293,416 | S | * | 12/1987 | Krueger | D8/373 |
| 5,060,892 | A | * | 10/1991 | Dougherty | 248/57 |
| 5,146,720 | A | * | 9/1992 | Turner | 52/98 |
| 5,277,005 | A | * | 1/1994 | Hellwig et al. | 52/220.1 |

(Continued)

*Primary Examiner* — Michael Safavi
(74) *Attorney, Agent, or Firm* — Maschoff Brennan

(57) ABSTRACT

A support apparatus configured to support free lengths of parallel components in residential implementations comprising a rectangular section and connection flaps. The rectangular section defines support holes and includes a rectangular section width that matches a width of two standard adjacent studs in a residential implementation. The support holes are configured to support and to separate free lengths of multiple, substantially parallel components. A first connection flap extends from a first end of the rectangular section. A second connection flap extends from a second end of the rectangular section. The rectangular section includes a first length between the first connection flap and the second connection flap configured to match a first standard distance between the two adjacent studs. The support apparatus includes a second length inclusive of the first connection flap and the second connection flap configured to match a second standard distance between two adjacent studs.

14 Claims, 8 Drawing Sheets

(56) References Cited

U.S. PATENT DOCUMENTS

| | | | |
|---|---|---|---|
| 5,440,848 A * | 8/1995 | Deffet | 15/376 |
| 5,596,859 A * | 1/1997 | Horton et al. | 52/481.1 |
| 5,836,130 A * | 11/1998 | Unruh et al. | 52/698 |
| 5,884,448 A * | 3/1999 | Pellock | 52/643 |
| 5,971,329 A * | 10/1999 | Hickey | 248/68.1 |
| 6,019,321 A * | 2/2000 | Carlson et al. | 248/49 |
| 6,158,066 A * | 12/2000 | Brown et al. | 4/695 |
| D448,650 S * | 10/2001 | Vrame | D8/356 |
| 6,394,398 B1 * | 5/2002 | Reed et al. | 248/57 |
| 6,418,682 B1 * | 7/2002 | Rice | 52/241 |
| 6,595,476 B1 * | 7/2003 | Edwards | 248/200.1 |
| 7,014,152 B2 * | 3/2006 | Grendahl | 248/49 |
| 7,039,965 B1 * | 5/2006 | Ismert | 4/695 |
| 7,823,846 B2 * | 11/2010 | Williams, III | 248/200.1 |
| 7,836,657 B1 * | 11/2010 | diGirolamo et al. | 52/712 |
| 8,226,051 B2 * | 7/2012 | Brown et al. | 248/68.1 |
| 8,245,466 B2 * | 8/2012 | Wright | 52/241 |
| 8,695,929 B2 * | 4/2014 | Cox | 248/68.1 |
| 2009/0038246 A1 * | 2/2009 | Wright | 52/220.1 |

* cited by examiner

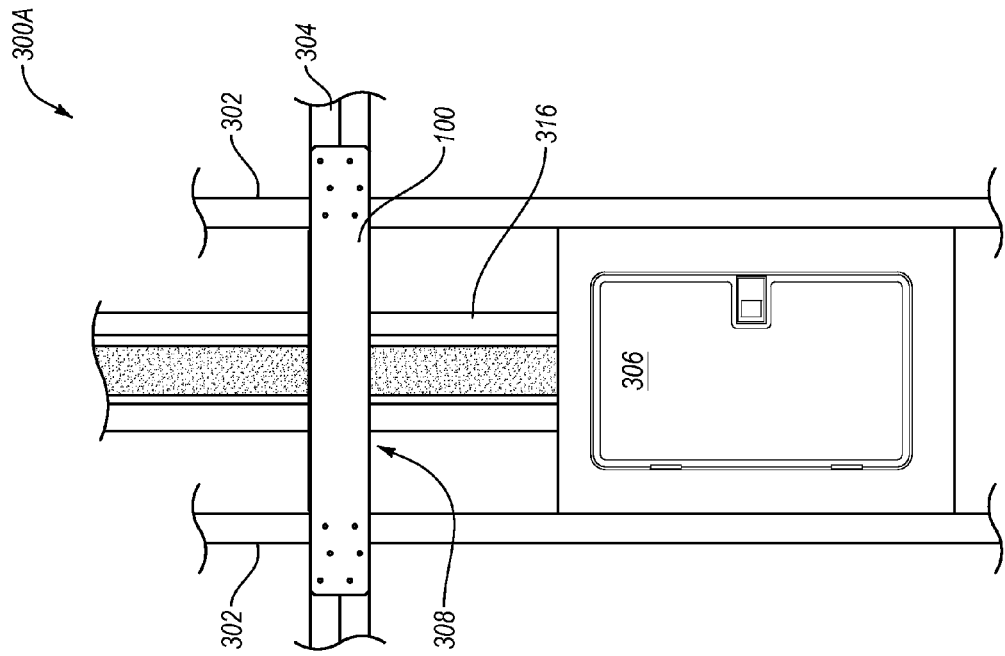
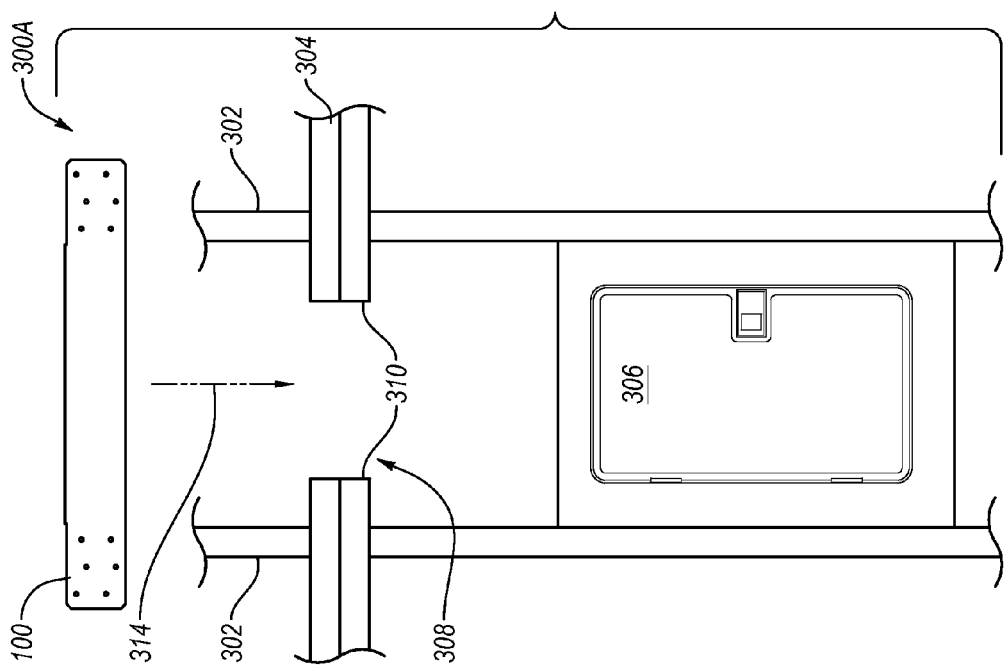

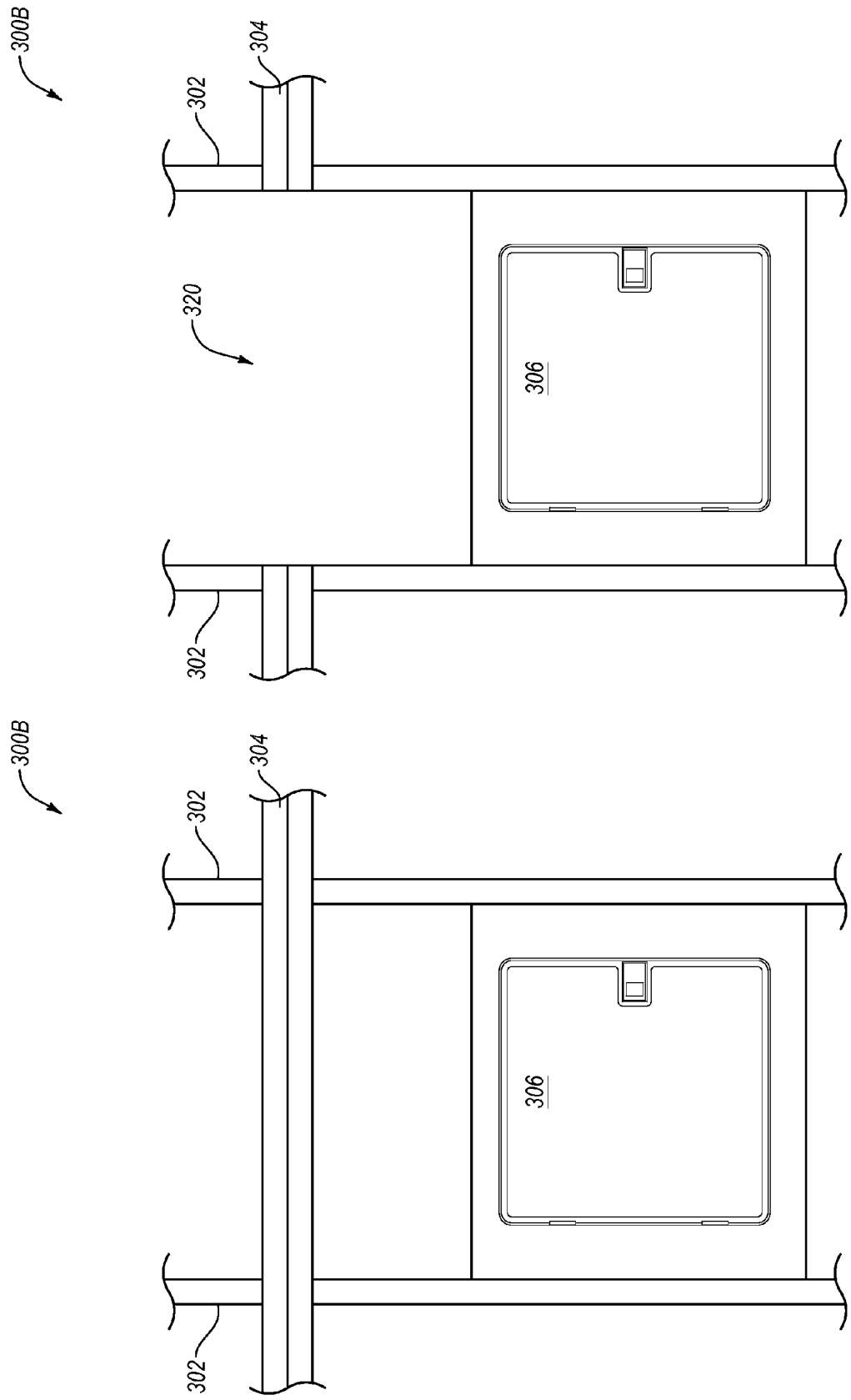

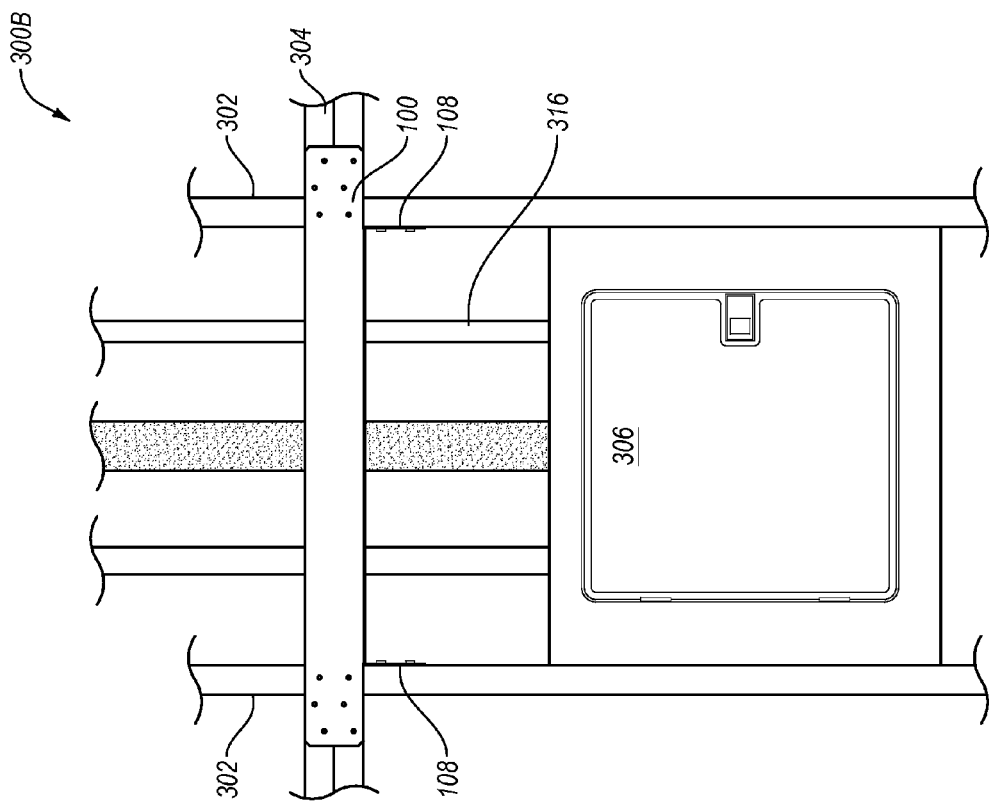
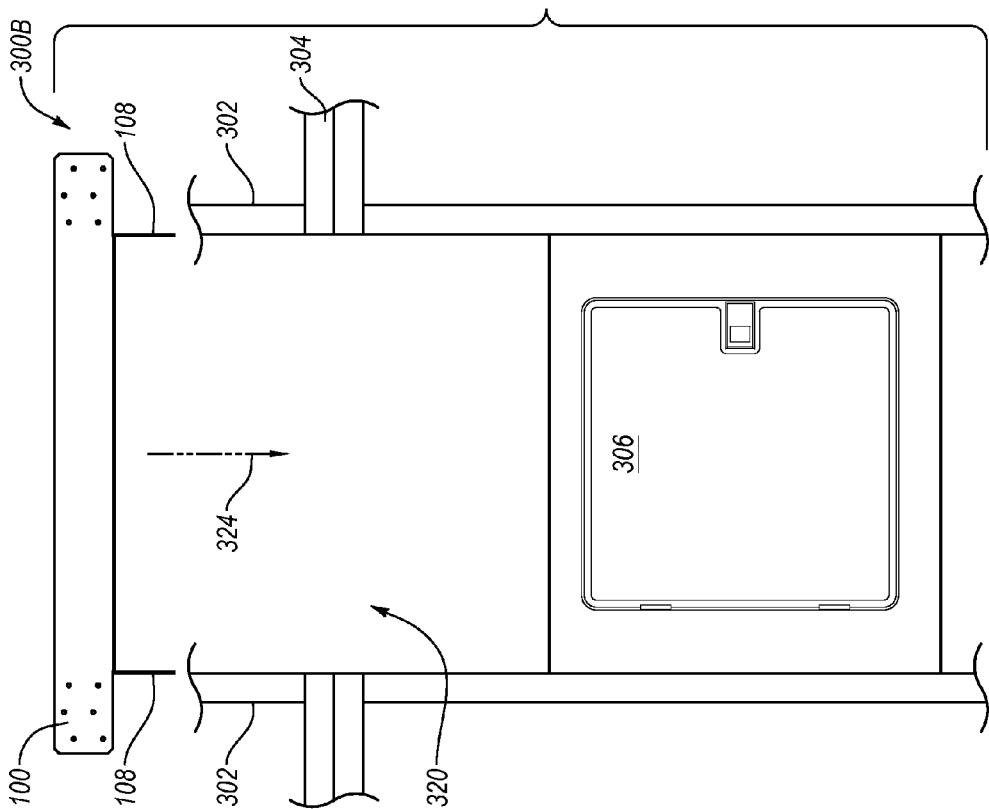

SUPPORT STRUCTURES FOR ELECTRICAL AND PLUMBING SYSTEMS

CROSS-REFERENCE TO RELATED APPLICATIONS

This patent application claims the benefit of and priority to U.S. Provisional Patent Application No. 61/822,899 filed May 13, 2013, which is incorporated herein by reference in its entirety.

FIELD

The embodiments discussed herein are related to support structures for electrical systems and plumbing systems.

BACKGROUND

In electrical systems, an electrical panel contains electrical breakers. The electrical breakers limit current supplied to electrical components in the electrical system. As the number of electrical components included in residences has increased, the number of electrical cables exiting the electrical panels has also increased. During operation of the electrical components, heat may be produced in the electrical cables. The heat may cause a dangerous situation. For example, when multiple electrical cables directly contact one another, the insulation of one or more electrical cables may break down because of heat generated in the electrical cables. When the insulation breaks down, a short between electrical circuits may be caused. Additionally, the heat may be transferred to materials surrounding the electrical cables, which may spark a fire.

Similarly, the complexity of plumbing systems has increased as the number of plumbing appliances has increased. For instance, plumbing systems may include multiple plumbing manifolds and/or radiant floor heating. The multiple plumbing manifolds and/or radiant floor heating may include multiple pipes or tubes that may be routed under floors and through walls. The pipes or tubes may extend from the plumbing appliances over long distances. When filled with water, the pipes or tubes may flex and rupture. When the pipes or tubes rupture, the water inside may leak and damage surrounding components.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a support apparatus configured to support free lengths of parallel components in residential implementations. The support apparatus may include a rectangular section and a first connection flap, and a second connection flap. The rectangular section defines support holes and includes a rectangular section width that matches a width of two standard adjacent studs in a residential implementation. The support holes are configured to support and to separate free lengths of multiple, substantially parallel components. The first connection flap extends from a first end of the rectangular section. The second connection flap extends from a second end of the rectangular section. The rectangular section includes a first length between the first connection flap and the second connection flap configured to match a first standard distance between the two adjacent studs. The support apparatus includes a second length inclusive of the first connection flap and the second connection flap configured to match a second standard distance between two adjacent studs.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 3A-3D illustrate a first installation process of the support apparatus of FIGS. 1A and 1B; and FIGS. 3E-3H illustrate a second installation process of the support apparatus of FIGS. 1A and 1B.

DESCRIPTION OF SOME EXAMPLE EMBODIMENTS

Figure 1A:
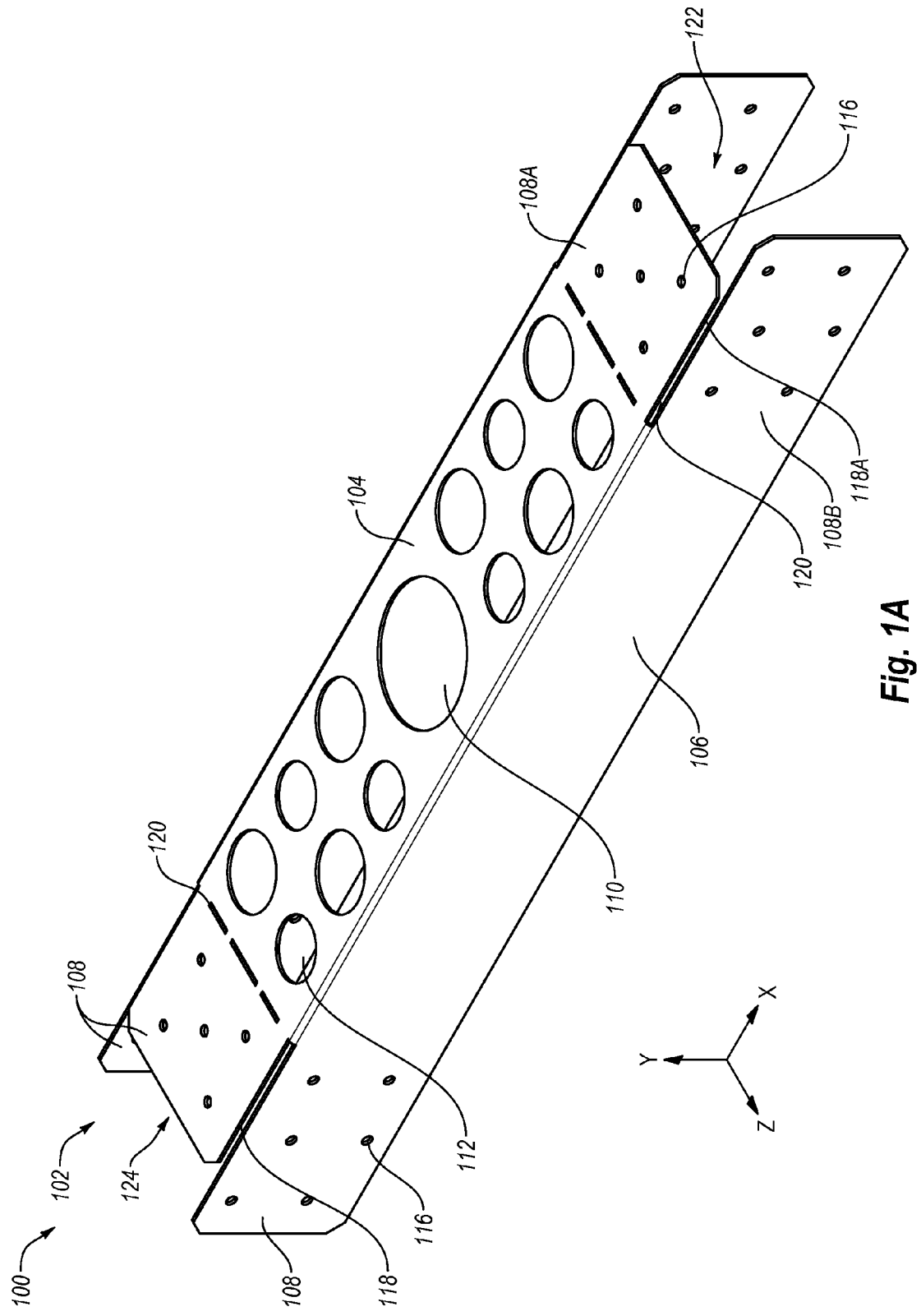
FIGS. 1A and 1B illustrate an example support apparatus.

Throughout residential and commercial implementations, free lengths of piping and electrical cables exist. These free lengths are often unsupported, which may allow damage, vibration, and application of other stresses to the pipes and electrical cables. Moreover, when multiple substantially parallel lengths of pipes and electrical cables exist in close proximity, the individual lengths of pipe and electrical cables may come in contact with one another, which may allow heat to transfer between the pipes or the electrical cables.

For example, contact between electrical cables exiting an electrical panel in a electrical system may cause dangerous situations. The contact may allow heat to transfer between the electrical cables, which breaks down insulation and may cause electrical fires, short electrical circuits, or overload electrical circuits. To support the electrical cables and to mitigate the heat, electrical cables are separated into multiple holes as they exit electrical boxes. In some jurisdictions, a specific configuration of the holes and an allocation of a number of electrical cables permitted in each hole are codified. An example of an applicable residential building code may require "holes to be bored so that the edge of the hole is not less than 32 mm (1¼ in.) from the nearest edge of the wood member. Where this distance cannot be maintained, the cable or raceway shall be protected from penetration by screws or nails by a steel plate(s) or bushing(s), at least 1.6 mm (1/16 in.) thick, and of appropriate length and width installed to cover the area of the wiring."

To support the free lengths of pipe or electrical cables in residential or commercial implementations, a set of holes is drilled or bored in a wooden stud immediately above the electrical panel or through wooden studs that perform some other function such as a floor joist, ceiling joist, etc. The electrical cables or the pipes are then routed through the set of holes and coupled to an appliance (e.g., the electrical panel or piping manifold). The set of holes drilled in the wooden studs separate the electrical cables or pipes, may support the free lengths of the electrical cable or pipes, and may satisfy an applicable building code. However, in the process of drilling the set of holes, the structural integrity of the wooden studs is substantially compromised.

Embodiments described herein support the free lengths of pipes and electrical cables in residential or commercial implementations while maintaining the structural integrity of the materials surrounding the free lengths of pipes and electrical cables. Additionally, some embodiments enable satisfaction of an applicable building code such as separation of electrical cables exiting an electrical panel. In one example embodiment, a top plate replacement (top plate) including a C-channel is substituted for a horizontal wooden stud immediately above an electrical panel. The C-channel defines multiple holes through which electrical cables may be routed. The C-Channel includes a horizontal section and two vertical sections. The horizontal section defines the set of holes and the vertical sections extend from the horizontal section, one on each side of the horizontal section. The ends of the horizontal section and the vertical sections include connection flaps. The connection flaps enable the connection of the top plate to the existing structure above the electrical panel. Some additional embodiments are explained with reference to the accompanying drawings.

Figure 1B:
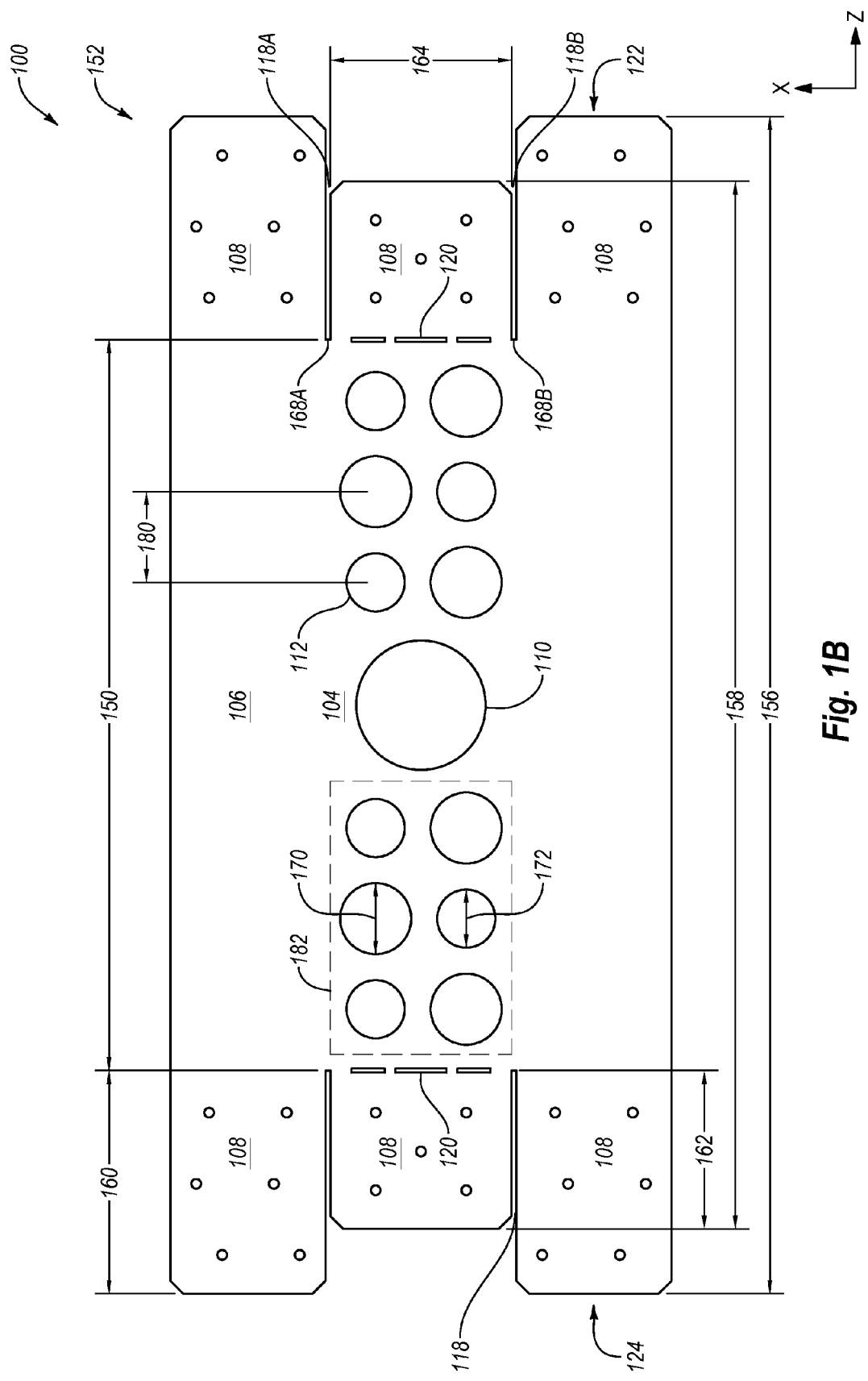

FIGS. 1A and 1B illustrate an example support apparatus (apparatus) 100. The apparatus 100 may be configured as a top plate replacement in some embodiments. When configured as a top plate replacement, the apparatus may satisfy applicable building codes requiring separation of electrical cables exiting electrical panels while maintaining structural integrity of materials surrounding the electrical panels. In alternative embodiments, the apparatus 100 may be configured to support piping or other electrical cables.

The apparatus 100 may be constructed of steel in this and other embodiments, which may allow for ease of construction and may provide adequate structural support for the materials surrounding the electrical panel. For example, the apparatus 100 constructed of steel may enable the installation of the apparatus 100 in load-bearing walls as well as non-load-bearing walls. In some alternative embodiments, the apparatus 100 may be constructed of another material or other materials such as aluminum, steel alloys, zinc-coated steel, zinc-treated steel, carbon composite, rigid plastics, or another suitable material.

The apparatus 100 may include a C-channel structure, generally indicated by item number 102 (FIG. 1A only). The C-channel structure 102 may include a horizontal section 104 and two vertical sections 106, one of which is visible in FIG. 1A. The designation as horizontal and vertical as used herein is arbitrarily defined. In the depicted embodiment, "horizontal" generally indicates that a component or feature is parallel to an xz plane and "vertical" generally indicates that a component or feature is parallel to an xy plane in an arbitrary-defined coordinate system.

In the depicted embodiment, one of the vertical sections 106 extends from each side of the horizontal section 104. The horizontal section 104 may generally support multiple parallel or substantially parallel electrical cables, pipes, or another component. The vertical sections 106 may provide protection from penetration by screws or nails into the electrical cables, pipes, or other component. The horizontal section 104 and the vertical sections 106 may generally contribute to structural support provided by the apparatus 100. The horizontal section 104 and/or the vertical sections 106 may be rectangular or substantially rectangular.

Connection flaps 108 may be attached at each end (generally indicated by 122 and 124) of the C-channel structure 102. Specifically, in this and other embodiments, the horizontal section 104 includes the connection flaps 108 at a first end 122 and at a second end 124. Likewise, the vertical sections 106 include the connection flaps 108 at the first end 122 and the second end 124. Some embodiments may omit one or more connection flaps 108 or enable removal of one or more connection flaps 108.

In the apparatus 100 depicted in FIGS. 1A and 1B, the connection flaps 108 included on the vertical sections 106 are longer than the connection flaps 108 included on the horizontal section 104. The increased length of the connection flaps 108 included on the vertical sections 106 may enable fastening of the vertical sections 106 and the apparatus 100 to additional surrounding materials. For example, the connection flaps 108 included on the vertical sections 106 may enable fastening of the vertical sections 106 to adjacent vertical studs and to horizontal nailers or cripples adjacent to the vertical studs.

In some non-illustrated embodiments, the connection flaps 108 included on the horizontal section 104 may be longer than the connection flaps 108 included on the vertical sections 106. Alternatively, the connection flaps 108 may have substantially equivalent lengths.

In the depicted embodiment, the apparatus 100 may be configured to support electrical cables exiting and/or entering a breaker box. Accordingly, the horizontal section 104 may define a supply cable hole 110 and one or more circuit cable holes 112, which are collectively referred to as holes 110/112. In FIGS. 1A and 1B only one circuit cable hole 112 is labeled. The circuit cable holes 112 in the apparatus 100 include all holes 110/112 other than the supply cable hole 110. The supply cable hole 110 may be configured to receive a supply cable that provides electricity to the electrical panel. Additionally, the circuit cable holes 112 may be configured to receive one or more electrical cables exiting the electrical panel that supply electricity to a circuit. As used herein, electrical cables may include, but are not limited to, NM, NMC, and NMS cable.

The circuit cable holes 112 and/or the supply cable hole 110 may be fitted with ferrules (not shown). The ferrules may be configured to fit in the circuit cable holes 112 and/or the supply cable hole 110. The ferrules may insulate the apparatus 100 from heat in electrical cables routed through the holes 110/112. Additionally, the ferrules 114 may reduce wear to insulation of one or more electrical cables that may result from the cables rubbing against the apparatus 100. In some embodiments, each of twelve circuit cable holes 112 and the supply cable hole 110 may be fitted with the ferrules. Alternatively, some of the circuit cable holes 112 may be fitted with ferrules 114 and some may not.

In this and other embodiments, the apparatus 100 defines one supply cable hole 110 and twelve circuit cable holes 112. Of the twelve circuit cable holes 112, there are six holes having a first diameter and six holes having a second diameter. Some additional details of the first and second diameters are discussed below. The depicted embodiment is not meant to be limiting. In some embodiments, the apparatus 100 may include fewer or more than twelve circuit cable holes 112. Additionally or alternatively, the apparatus 100 may omit the supply cable hole 110 or include more than one supply cable hole 110. Additionally or alternatively, the circuit cable holes 112 may have the same diameter or more than two diameters.

Additionally or alternatively, as depicted in FIGS. 1A and 1B, the supply cable hole 110 may be defined between two groups 182 (only one of which is labeled in FIG. 1B) of six circuit cable holes 112. This configuration is also not meant to be limiting. In some embodiments, the supply cable hole 110 may be defined near the first end 122 of the horizontal section 104 and the circuit cable holes 112 may be defined near the second end 124 of the horizontal section 104.

In FIGS. 1A and 1B, the holes 112/110 are substantially circular. However, this depiction is not meant to be limiting. For example, in a non-illustrated embodiment, a supply cable hole and/or multiple circuit cable holes may have a rounded-rectangular shape. The supply cable hole and/or the multiple circuit cable holes may function substantially similarly to the holes 112/110 described with reference to FIGS. 1A and 1B and may be fitted with ferrules in some embodiments.

The connection flaps 108 are separated from one another by one or more gaps 118. For example, a first horizontal connection flap 108A is separated from a first vertical connection flap 108B by a first gap 118A. The gaps 118 enable each of the connection flaps 108 to be independently bent and/or removed from the C-channel structure 102. For example, the first horizontal connection flap 108A may be bent such that the first horizontal connection flap 108A is substantially perpendicular to the horizontal section 104. Additionally, the first vertical connection flap 108B may be bent such that the first vertical connection flap 108B is substantially perpendicular to the vertical sections 106. Additionally or alternatively, the first horizontal connection flap 108A, the first vertical connection flap 108B, or any other connection flap 108 may be removed or may be left as depicted in FIGS. 1A and 1B. By enabling removal and/or bending of each of the connection flaps 108, the apparatus 100 may be installed in multiple configurations. Some additional details of the multiple configurations are provided below with reference to FIGS. 3A-3H.

In some embodiments, between the connection flaps 108 and the horizontal section 104 and/or the vertical sections 106, the apparatus 100 may define one or more bending cuts 120. The bending cuts 120 may be configured to facilitate bending of the connection flaps 108. For example, in embodiments in which the bending cuts 120 are omitted, a force of about 50 Newtons (N) may be used to bend a connection flap 108 such that the connection flap is perpendicular to the horizontal section 104 or one of the vertical sections 106. All other factors being equal, in an embodiment including the bending cuts 120, a second force of about 35 N may be used to bend the connection flap 108.

The connection flaps 108 may define one or more fastener holes 116. The fastener holes 116 may be configured to receive a fastener that may be used to secure the apparatus 100 to surrounding materials. For example, in the depicted embodiments, the surrounding materials may include a top plate above an electrical box. In alternative embodiments, the surrounding materials may include floor joists, ceiling joists, rafters, girders, beams, wall framing, and the like. In this and other embodiments, the connection flaps 108 connected to the horizontal section 104 define five fastener holes 116 and the connection flaps 108 connected to the vertical sections 106 define six fastener holes 116. However, this is not meant to be limiting. The connection flaps 108 may include fewer than five or more than six fastener holes 116. Additionally or alternatively, the connection flaps 108 connected to the horizontal section 104 may define a same number of fastener holes 116 as the connection flaps 108 connected to the vertical sections 106.

The particular layout of the fastener holes 116 may be configured to attach the apparatus 100 to a specific structure. For example, if a top plate, which is being removed for installation of the apparatus 100, includes two stacked 2×4 boards, then the fastener holes 116 may be separated such that a fastener driving through one of the fastener holes 116 is positioned in a center of each of the two stacked 2×4 boards.

In some embodiments, the apparatus 100 may be manufactured from a sheet of material and subsequently shaped into the C-channel structure 102. FIG. 1B illustrates the apparatus 100 in an example pre-shaped configuration 152. The pre-shaped configuration 152 is the apparatus 100 depicted in FIG. 1A prior to being shaped into the C-channel structure 102.

With reference to FIG. 1B, the apparatus 100 may be configured for one or more structural applications. For example, the apparatus 100 may include length dimensions 156 and 158. The length dimensions 156 and 158 may defined between the first end 122 and the second end 124. In the depicted embodiment, the length dimensions 156 and 158 are different due to the difference in length between the connection flaps 108 included on the horizontal section 104 and the connection flaps 108 included on the vertical sections 106. In some embodiments, the length dimensions 156 and/or 158 may be determined by a standard length between adjacent studs in a residential implementation or a commercial implementation, according to a housing or building code, in relation to an adjacent electrical panel, or some combination thereof. For example, in some residential implementations, a distance between adjacent studs may be about twenty-two inches (on center) or sixteen inches (on center). Accordingly, the length dimensions 156 and/or 158 may be between about twenty-one and about twenty-one and one-quarter inches. In commercial implementations, a distance between adjacent studs may be the same as in residential implementations or may vary depending on a specific location in a commercial structure. For example, some interior walls may space studs differently (e.g., twenty-four inches on center, twenty-two inches on center, or sixteen inches on center, which may depend on drywall thickness).

Additionally, a distance 150 between the bending cuts 120 may be configured to correspond to or match a standard distance between adjacent studs in a residential implementation or a commercial implementation. The distance 150 may enable the connection flaps 108 included on the horizontal section 104 to be bent perpendicular to the horizontal section 104. The apparatus 100 may then be installed between the adjacent studs with the connection flaps 108 contacting the interior surface (e.g., those surfaces facing the apparatus 100) of the adjacent studs. For example, in some residential implementations, a distance between adjacent studs may be about twenty-two inches (on center) or sixteen inches (on center). Accordingly, the distance 150 may be between about fourteen and about fourteen and one-quarter inches or between about twenty-one and about twenty-one and one-quarter inches.

Additionally, the apparatus 100 may include a vertical section connector length 160. The vertical section connector length 160 may be defined between one of the ends 122 or 124 measured at one of the connection flaps 108 included in one of the vertical sections 106 and an end of a nearest gap 118 (also corresponding in some embodiments to the bending cut 120). The vertical section connector length 160 may correspond to a width of the surrounding structure to which the apparatus 100 may be fastened. For example, the vertical sections 106 may be configured to attached to adjacent studs including two 2×4s and a nailer adjacent to the adjacent studs. Accordingly, the vertical section connector length 160 may be between about four and one-half inches and about four and three-quarter inches.

Additionally, the apparatus 100 may include an on-center separation 180. The on-center separation 180 may be measured between centers of adjacent cable circuit holes 112. In this and other embodiments the on-center separation 180 may be substantially equivalent between each circuit cable hole 112 in the group 182. In some embodiments, the on-center separation 180 may vary within the group 182.

Additionally, the apparatus 100 may include a horizontal section connector length 162. The horizontal section connector length 162 may be defined between one of the ends 122 or 124 measured at one of the connection flaps 108 included in the horizontal section 104 and an end of the nearest gap 118. The horizontal section connector length 162 may correspond to a width of surrounding structure to which the apparatus 100 may be fastened. In some embodiments, the apparatus 100 may be fastened to a top plate including two 2×4 wooden studs. For example, a center portion of the top plate may be removed and the apparatus 100 may be fastened to the remaining outer portions. Accordingly, the horizontal section connector length 162 may be between about three and one-quarter inches and about three and one-half inches.

Alternatively, the top plate may be completely removed between adjacent studs. Accordingly, the apparatus 100 may be fastened to one or more interior surfaces of the adjacent studs. In this and other alternative installation configurations, the horizontal section connector length 162 may be between about three and one-quarter inches and about three and one-half inches or another suitable length.

Additionally, the apparatus 100 may include a horizontal section width 164. The horizontal section width 164 may be configured to correspond to or match a standard dimension of an adjacent structure such as an adjacent horizontal stud. An example of the adjacent horizontal stud may include a top plate above an electrical box. The horizontal section width 164 may be defined between an outer edge 168A of the first gap 118A and an outer edge 168B of a second gap 118B.

In some embodiments, the horizontal section width 164 may be between about three and one-quarter inches and about three and one-half inches or between about five and one-quarter inches and about five and one-half inches. In examples in which the horizontal section width 164 is about three and one-half inches or about five and one-half inches, the apparatus 100 may be configured to fit (e.g., replace and/or at least partially wrap around) a standard 2×4 or a standard 2×6, respectively.

Additionally, as mentioned above, the circuit cable holes 112 may include one or more diameters 170 and 172. The diameters 170 and 172 may be sized according to a standard or a code and/or the diameters 170 and 172 may be sized such that with a ferrule may be sized in compliance with a standard or a code. For example, an electrical code may allow three cables to be routed through the circuit cable hole 112 having a diameter of three-quarter inches and four cables to be routed through the circuit cable hole 112 having a diameter of one inch. Accordingly, a first diameter 170 may be about three-quarter inches and a second diameter 172 may be about one inch in embodiments not using ferrules. Additionally or alternatively, the first diameter 170 may be about one and one-tenth inches and the second diameter 172 may be about one and three-eighths inches in embodiments in which ferrules are introduced into the circuit cable holes 112.

In some non-illustrated embodiments, the apparatus 100 may include multiple notches. The notches may be positioned such that there is a break between the connection flaps 108 and the remainder of the vertical sections 106. Along a length between the notches, a rolled edge may be formed. For example, the rolled edge may remove the sharp edge such that electrical cables routed through the circuit cable holes 112 do not become frayed or otherwise compromised. Additionally, the rolled edge may provide some safety to individuals installing the apparatus 100. The rolled edge may also improve strength of the apparatus 100.

Alternatively, in some non-illustrated embodiments, the vertical sections 106 may include a protruding section. The protruding section may be substantially defined along the length between the bending cuts 120 or some portion thereof. The protruding section may have a length (e.g., a dimension in the z direction) of between one-quarter and about one-half inches. The protruding section may be rolled in order to form the rolled edge.

With combined reference to FIGS. 1A and 1B, in some embodiments, the apparatus 100 may be configured to have pipes rather than electrical cables routed through holes, which may be similar to the circuit cable holes 112. In these and other embodiments, the apparatus 100 may provide support for the pipes rather than the electrical cables. For example, when installing a plumbing manifold or radiant heat flooring system, multiple holes may be drilled through surrounding materials. The pipes are then routed through the holes drilled through surrounding materials. However, the holes drilled in the surrounding materials weaken the surrounding materials. Accordingly, the apparatus 100 may be used to support the pipes instead of leaving the compromised surrounding materials.

In these and other embodiments, instead of the holes 110/112 being defined as depicted in FIGS. 1A and 1B, multiple piping holes, which are substantially similar to the circuit cable holes 112 discussed above, may be defined in the horizontal section 104. Pipes may be routed through the piping holes after (or concurrently with) the apparatus 100 is installed above a manifold or an entry point into a radiant heating floor system. For example, the apparatus 100 may define fourteen piping holes having a single diameter 172 that are evenly spaced on the horizontal section 104. Alternatively, the apparatus 100 may include any configuration (diameter size and number) of the piping holes.

In embodiments of the apparatus 100 used for pipes, the horizontal section width 164, the length dimensions 156 and 158, the vertical section connector length 160, the horizontal section connector length 162, or some combination thereof may be different from the dimensions discussed above. For example, the length dimensions 156 and/or 158 may be twenty-four inches or otherwise determined by a standard length between wooden studs in a residence, according to a housing code, in relation to an adjacent system, or some combination thereof.

A first example of the apparatus 100 that may be configured to route electrical cables may be referred to as TR-6. The TR-6 may be used as a top plate replacement when the surrounding materials of an electrical panel include 2×6 framing. Accordingly the horizontal section width 164 is between about five and one-quarter inches and about five and one-half inches. The TR-6 may also allow an installer to route wires around trusses or framing. The TR-6 includes the protruding section which may be rolled over. Additionally, the TR-6 includes eighteen circuit cable holes 112 arranged in two groups 182 of nine. Each of the groups 182 is located on one side of the supply cable hole 110. The circuit cable holes 112 have two diameters 170 and 172. The circuit cable holes 112 in each group 182 are evenly spaced on the horizontal section 104. The on-center separation 180 is about one and one-half inches.

A second example of the apparatus 100 that may be configured to route electrical cables may be referred to as TR-4. The TR-4 may be used as a top plate replacement when an electrical panel is surrounded by 2×4 framing. Accordingly the horizontal section width 164 is between about three and one-quarter inches and about three and one-half inches. The TR-4 may also allow an installer to route wires around trusses or framing. The TR-4 includes the protruding section which may be rolled over to form a rolled edge. The protruding section is one-half inch by fourteen inches. Additionally, the TR-4 includes twelve circuit cable holes 112 arranged in two groups 182 of six. Each of the groups 182 is located on one side of the supply cable hole 110. The circuit cable holes 112 have two diameters 170 and 172. The circuit cable holes 112 in each group 182 are evenly spaced on the horizontal section 104. The on-center separation 180 is about one and one-half inches. The supply cable hole 110 has a diameter of about two and one-half inches.

A third example of the apparatus 100 that may be configured to route piping may be referred to as TR-4p. The TR-4p may be implemented to support tubing or piping. Additionally, the TR-4p may replace the top plate constructed of 2×4 framing. Accordingly, the horizontal section width 164 is between about three and one-quarter inches and about three and one-half inches. The TR-4p includes the protruding section, which may be rolled over. The protruding section is one-half inch by fourteen inches. Additionally, the TR-4p includes eight piping holes arranged in a single group 182 without the supply cable hole 110. The piping holes have two diameters 170 and 172. The piping holes are evenly spaced on the horizontal section 104. The on-center separation 180 is about one and one-half inches.

Other examples of the apparatus 100 are within the scope of this disclosure. These other example embodiments may include one or more of the described features in any combination or sub-combination.

Figure 2A:
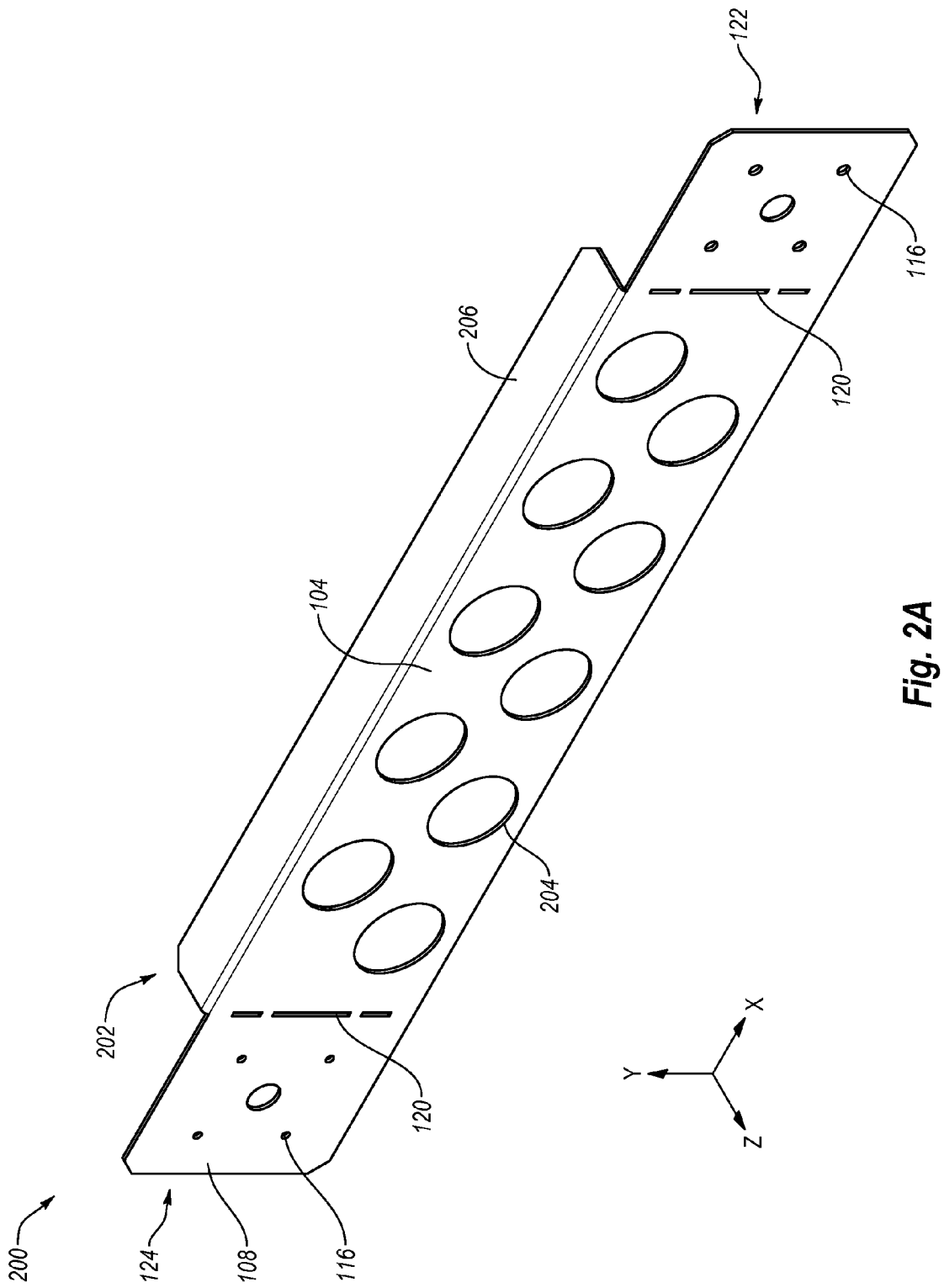
FIGS. 2A and 2B illustrate a second example support apparatus.
Figure 2B:
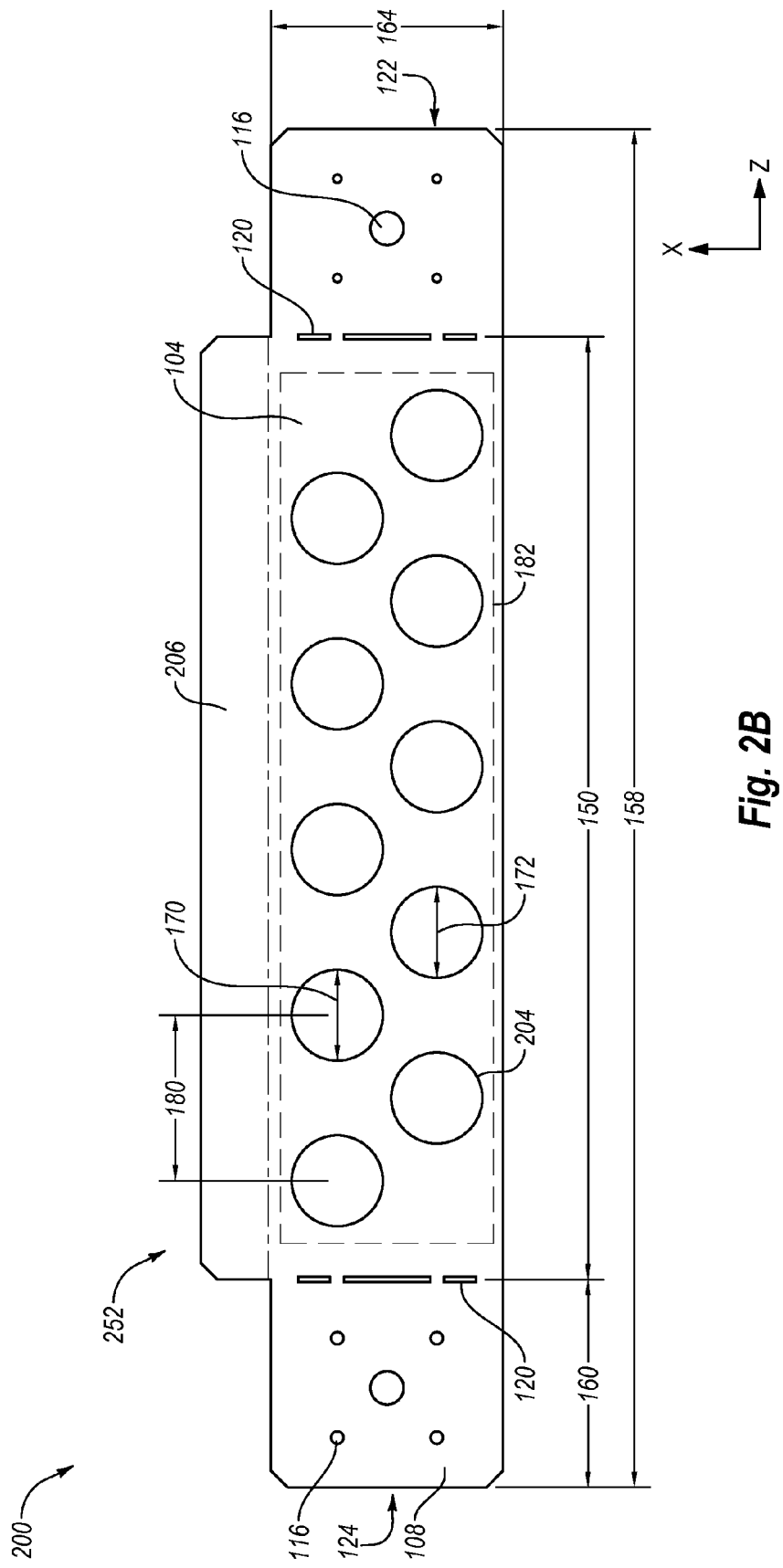

FIGS. 2A and 2B illustrate another example support apparatus (hereinafter, "second apparatus") 200. Specifically, FIG. 2A depicts a bent configuration 202 of the second apparatus 200 and FIG. 2B depicts a pre-shaped configuration 252 of the second apparatus 200. The second apparatus 200 is substantially similar to the apparatus 100 depicted in FIGS. 1A and 1B. Accordingly, the second apparatus 200 includes many of the components and features described with reference to FIGS. 1A and 1B. Discussion of these components and features is not repeated with reference to FIGS. 2A and 2B.

The second apparatus 200 does not include the vertical sections 106 of FIGS. 1A and 1B. Instead, the second apparatus 200 includes the horizontal section 104 defining piping holes 204 and a partial vertical section 206. The second apparatus 200 is depicted with one partial vertical section 206 connected to the horizontal section 104. In some embodiments, the second apparatus 200 may include two partial vertical sections 206 that connect to each side of the horizontal section 104 or no partial vertical sections. The partial vertical section 206 may also be folded over to form a rolled edge in some embodiments similar to the protruding section discussed above.

Additionally, the embodiment depicted in FIGS. 2A and 2B includes the piping holes 204 arranged in a staggered configuration. The on-center separation 180 in a staggered configuration may be measured between adjacent piping holes 204. This is not meant to be limiting. In some embodiments, the second apparatus 200 may include any configuration (size, number, and arrangement) of piping holes 204. Additionally, in some embodiments, the second apparatus may include circuit cable holes (e.g., the circuit cable holes 112) and/or supply cable holes (e.g., the supply cable holes 110) in one or more of the configurations depicted in FIGS. 1A and 1B and/or discussed herein.

The second apparatus 200 may be installed and used in a similar manner to that described with respect to the apparatus 100 and discussed below with reference to FIGS. 3A-3H.

Additionally, the second apparatus 200 may be installed anywhere pipes and/or electrical cables are routed and may benefit from physical support. For example, in long drops (e.g., eight to ten feet) one or more second apparatuses 200 may be installed to route the electrical cables or pipes and keep the electrical cables or pipes from coming in contact with one another.

A first example of the second apparatus 200 that may be configured to route electrical cables may be referred to as TR-4s. The TR-4s may be implemented to support electrical cables running vertically between framing members, for instance. Additionally or alternatively, the TR-4s may be implemented to support electrical cables directly above an electrical panel. Additionally, the TR-4s may replace the top plate constructed of 2×4 framing. Accordingly, the horizontal section width 164 is between about three and one-quarter inches and about three and one-half inches. The TR-4s does not include a partial vertical section and includes twelve circuit holes arranged in two groups 182 with a supply cable hole separating the two groups 182, similar to the holes 112/110 depicted in FIGS. 1A and 1B. The circuit cable holes have two diameters 170 and 172. The circuit cable holes of each group 182 are evenly spaced on the horizontal section 104. The on-center separation 180 of each group 182 is about one and one-half inches. The supply cable hole is equally spaced from the two groups 182 of circuit cable holes.

A second example of the second apparatus 200 that may be configured to route piping may be referred to as TR-6p. The TR-6p may be implemented for holding tubing or piping in a radiant in-floor heat system. Additionally or alternatively, the TR-6p may be implemented to support piping running vertically between framing members. Additionally or alternatively, the TR-6p may be implemented to support piping directly above a plumbing manifold. The TR-6p includes a length dimension 158 of about twenty and one-quarter inches. In another embodiment, the TR-6p may include the length dimension 158 of about twenty-four inches. The TR-6p may replace the top plate constructed of 2×6 framing. Accordingly, the horizontal section width 164 is between about five and one-quarter inches and about five and one-half inches. The TR-6p does not include a partial vertical section. Additionally, the TR-6p includes sixteen piping holes 204 arranged in a single group 182 without a supply cable hole. The piping holes 204 have a single diameter 170 or 172. The piping holes 204 are evenly spaced on the horizontal section 104. The on-center separation 180 is about one and nine-sixteenth inches.

A third example of the second apparatus 200 that may be configured to route piping may be referred to as TS-1.5. The TS-1.5 may be implemented for holding tubing or piping in a radiant in-floor heat system. Additionally or alternatively, the TS-1.5 may be implemented to support piping running vertically between framing members. Additionally or alternatively, the TS-1.5 may be implemented to support piping directly above a plumbing manifold. The TS-1.5 includes the length dimension 158 of about twenty and one-quarter inches. The TS-1.5 may be installed as a support strap rather than replacing a top plate. Accordingly, the horizontal section width 164 is between about one and five-eighths inches and about one and three-fourths inches. The TS-1.5 includes the partial vertical section 206 connected to each side of the horizontal section 104. Additionally, the TS-1.5 includes eighteen piping holes 204 arranged in a single group 182 without a supply cable hole. The piping holes 204 have a single diameter 170 or 172 of about one-quarter inches. The piping holes 204 are evenly spaced on the horizontal section 104 in a staggered configuration. The on-center separation 180 is about one and one-half inches.

FIGS. 3A-3D illustrate a first installation process 300A and FIGS. 3E-3H illustrate a second installation process 300B of the apparatus 100, which may also be implemented with embodiments of the second apparatus 200. The installation processes 300A and 300B are simplified to illustrate some example installation configurations of the apparatus 100 and/or the second apparatus. The description of FIGS. 3A-3H is not meant to be limiting and may include a subset of steps in an installation process and may include steps that in some embodiments are performed in another order.

FIGS. 3A-3H depict a planar view of an electrical panel 306 and some surrounding materials (e.g., 304 and 302). Specifically, with combined reference to FIGS. 3A-3H, the electrical panel 306 may be positioned below a horizontal wooden stud 304. The horizontal wooden stud 304 may be attached to two vertical wooden studs 302. In the example installation processes 300A and 300B, the studs 302 and 304 are described as wooden; however, in some alternative embodiments one or more of the vertical studs and/or the horizontal stud may include another material.

Figure 3B:
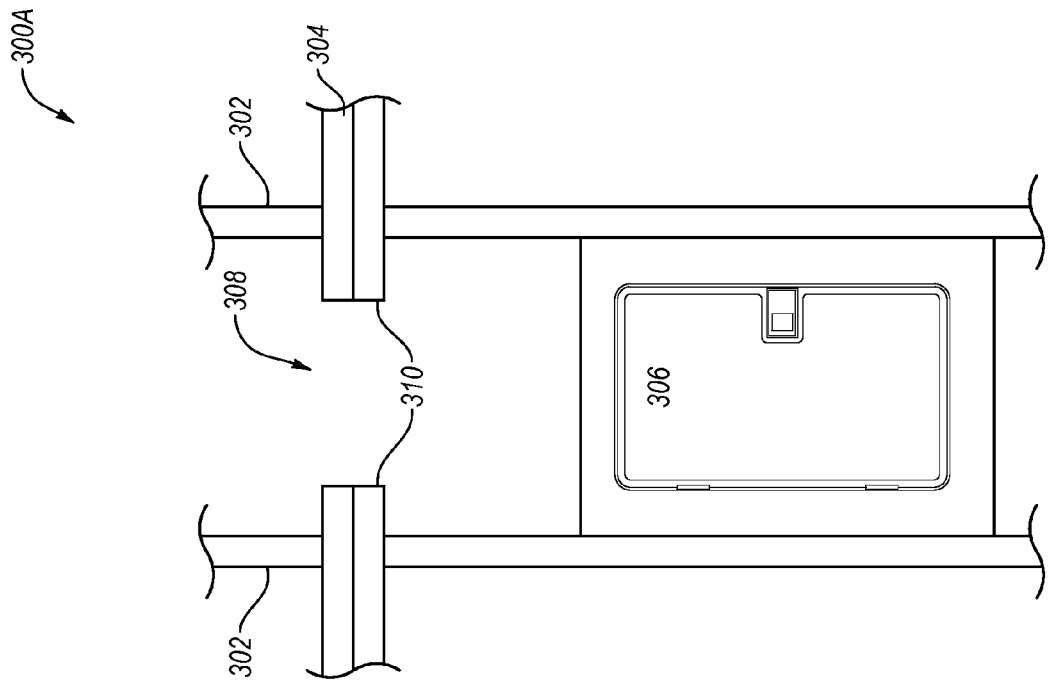
Figure 3A:
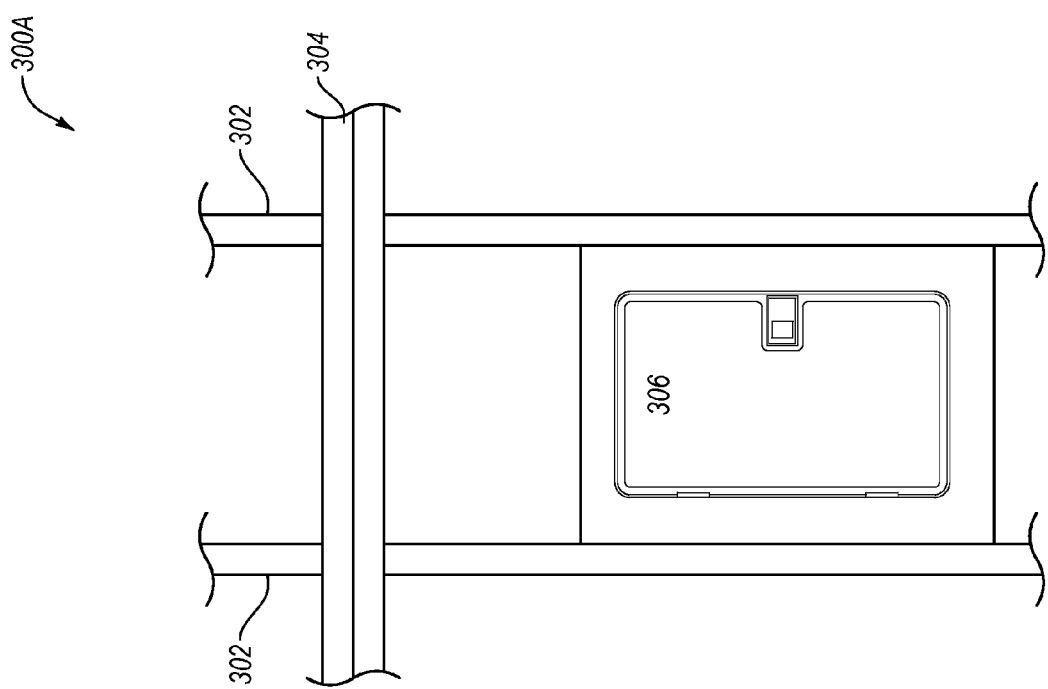

FIGS. 3A-3D illustrate the first installation process 300A in which the apparatus 100 is used in a first installation configuration. FIG. 3A is substantially described above. Referring to FIG. 3B, in the first installation process 300A, the horizontal wooden stud 304 may be cut such that a removed section, generally indicated by 308, is removed from the horizontal wooden stud 304. The removed section 308 that is removed from the horizontal wooden stud 304 does not span a length between the vertical wooden studs 302. Instead, cantilevers 310 extend from each of the vertical wooden studs 302 into the volume between the vertical wooden studs 302.

Referring to FIG. 3C, the apparatus 100 may be installed in place of the removed section 308. The apparatus 100 may be moved in a direction generally indicated by arrow 314 in FIG. 3C.

Referring to FIGS. 1A-2B and 3B-3D, when the horizontal section 104 rests on top of the cantilevers 310, the apparatus 100 may then be fastened to the cantilevers 310, which are hidden in FIG. 3D by the apparatus 100 in FIG. 3D. Specifically, in this embodiment, the horizontal section 104 may rest on top of the cantilevers 310. Additionally, the horizontal section 104 may be fastened to the cantilevers 310. Additionally or alternatively, the vertical sections 106 may be positioned adjacent to front surfaces or rear surfaces of the cantilevers 310 and fastened to the front surfaces or the rear surfaces of the cantilevers 310. Cables 316 may then be routed through holes 112/110 and connected to a circuit breaker or fuse within the electrical panel 306.

In some embodiments, the apparatus 100 may be moved in a direction opposite that indicated by arrow 314. In these and other embodiments, the horizontal section 104 may be fastened to a bottom of the cantilevers 310.

FIGS. 3E-3H illustrate the second installation process 300B in which the apparatus 100 is used in a second installation configuration. FIG. 3E is substantially similar to FIG. 3A described above. Referring to FIG. 3F, in the second installation process 300B, the horizontal wooden stud 304 may be cut such that a removed section, generally indicated by 320, is removed from the horizontal wooden stud 304. The removed section 320 that is removed from the horizontal wooden stud 304 may span a length between the vertical wooden studs 302. Accordingly, no cantilevers (310 in FIGS. 3B and 3C) extend into the volume between the vertical wooden studs 302.

Referring to FIGS. 1A-2B and 3G, the apparatus 100 may be installed into the removed section 320. In this and other embodiments, the connection flaps 108 may be bent. Specifically, the connection flaps 108 may be bent such that the connection flaps 108 are substantially parallel to the vertical wooden studs 302. The apparatus 100 may be moved in a direction generally indicated by arrow 324 in FIG. 3G.

In FIG. 3G, the connection flaps 108 are depicted as being bent towards the electrical panel 306 and the horizontal section 104 closer to the electrical panel 306. This is not meant to be limiting. The connection flaps 108 may be bent away from the electrical panel 306 with the horizontal section 104 oriented away from the electrical panel 306. Alternatively, one connection flap 108 may be bent towards and one connection flap 108 may be bent away, and the like.

Referring to FIG. 3H, when the apparatus 100 is substantially aligned with the horizontal wooden stud 304, the apparatus 100 may be fastened to the horizontal wooden stud 304 and/or the vertical wooden studs 302. Specifically, in this and other embodiments, the connection flaps 108 may be fastened to an interior surface of the vertical wooden studs 302 as shown in FIG. 3H. Additionally or alternatively, the vertical sections 106 may be positioned adjacent to a front surface or a rear surface of the horizontal wooden stud 304 and fastened to the horizontal wooden stud 304. Cables 316 may then be routed through holes 112/110 and connected to a breaker or a fuse within the electrical panel 306.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A support apparatus configured to support free lengths of parallel components in residential implementations, the apparatus comprising:
    a rectangular section that defines a plurality of support holes, wherein the rectangular section includes a rectangular section width configured to match a width of two standard adjacent studs in a residential implementation, and wherein the plurality of support holes are configured to support and to separate free lengths of multiple, substantially parallel components;
    a first connection flap that extends from a first end of the rectangular section;
    a second connection flap that extends from a second end of the rectangular section;
    a second section that extends at a substantially right angle from a first side of the rectangular section;
    a third connection flap that extends from a first end of the second section;
    a fourth connection flap that extends from a second end of the second section;
    a third section that extends at a substantially right angle from a second side of the rectangular section;
    a fifth connection flap that extends from a first end of the third section; and
    a sixth connection flap that extends from a second end of the third section,
    wherein:
    the rectangular section includes a first length between the first connection flap and the second connection flap that is configured to match a first standard distance between the two adjacent studs in a residential implementation, the support apparatus includes a second length inclusive of the first connection flap and the second connection flap that is configured to match a second standard distance between two adjacent studs in a residential implementation, the apparatus includes a third length including the third section inclusive of the fifth and sixth connection flaps which is greater than the second length, the support apparatus is configurable in a first installation configuration and a second installation configuration, in the first installation configuration, the first connection flap and the second connection flap are substantially parallel to the rectangular section and contact a top surface of cantilevered sections of a top plate that connects the two adjacent studs, the third connection flap and the fourth connection flap contact a front surface of the cantilevers sections, and the fifth connection flap and the sixth connection flap contact a rear surface of the cantilevers sections, and in the second installation configuration, the first connection flap and the second connection flap are bent to substantially right angles with respect to the rectangular section and contact interiors surface of the two adjacent studs, the third connection flap and the fourth connection flap contact a front surface of the two adjacent studs, and the fifth connection flap and the sixth connection flap contact a rear surface of the two adjacent studs.

2. The support apparatus of claim 1, wherein the first length includes about fourteen and one-half inches and the second length includes about twenty and one-half inches.

3. The support apparatus of claim 1, wherein the third length includes about twenty-two inches.

4. The support apparatus of claim 1, wherein the support holes include at least two diameters.

5. The support apparatus of claim 1, wherein the support apparatus is constructed of one or more of: aluminum, a steel alloy, a zinc-coated steel, a zinc-treated steel, a carbon composite, and a rigid plastic.

6. The support apparatus of claim 1, wherein the substantially parallel components include electrical cables exiting the electrical panel that supply electricity to a circuit.

7. The support apparatus of claim 1, wherein the plurality of support holes include a supply cable hole and twelve circuit cable holes.

8. The support apparatus of claim 1, further comprising ferrules that are fit in the plurality of support holes.

9. A top plate replacement configured to support electrical cables exiting an electrical panel in residential implementations, the top plate replacement comprising:

a horizontal section that defines a plurality of circuit cable holes and a supply cable hole, wherein the horizontal section includes a width configured to match a width of two standard adjacent studs in a residential implementation;

a first connection flap that extends from a first end of the horizontal section;

a second connection flap that extends from a second end of the horizontal section;

a second section that extends at a substantially right angle from a first side of the horizontal section;

a third connection flap that extends from a first end of the second section;

a fourth connection flap that extends from a second end of the second section;

a third section that extends at a substantially right angle from a second side of the horizontal section;

a fifth connection flap that extends from a first end of the third section; and a sixth connection flap that extends from a second end of the third section, wherein:

the horizontal section includes a first length between the first connection flap and the second connection flap that is configured to match a first standard distance between the two adjacent studs in a residential implementation, the top plate replacement includes a second length inclusive of the first connection flap and the second connection flap that is configured to match a second standard distance between two adjacent studs in a residential implementation, the top plate replacement includes a third length including the third section inclusive of the fifth and sixth connection flaps which is greater than the second length the top plate replacement is configurable in a first installation configuration and a second installation configuration, the first installation configuration includes the first connection flap and the second connection flap substantially parallel to the horizontal section to contact a top surface of cantilevered sections of the top plate connecting the two adjacent studs, the third connection flap and the fourth connection flap contact a front surface of the cantilevers sections, and the fifth connection flap and the sixth connection flap contact a rear surface of the cantilevers sections, and the second installation configuration includes the first connection flap and the second connection flap bent to substantially right angles with respect to the horizontal section to contact an interior surface of a top plate connecting the two adjacent studs, the third connection flap and the fourth connection flap contact a front surface of the two adjacent studs, and the fifth connection flap and the sixth connection flap contact a rear surface of the two adjacent studs.

10. The top plate replacement of claim 9, wherein the first length includes about fourteen and one-half inches, the second length includes about twenty and one-half inches, and the third length includes about twenty-two inches.

11. The top plate replacement of claim 9, wherein the cable circuit holes include at least two diameters.

12. The top plate replacement of claim 9, wherein the top plate replacement is constructed of one or more of: aluminum, a steel alloy, a zinc-coated steel, a zinc-treated steel, a carbon composite, and a rigid plastic.

13. The top plate replacement of claim 9, wherein the plurality of circuit cable holes include a supply cable hole and twelve circuit cable holes.

14. The top plate replacement of claim 9, further comprising ferrules that are fit in the plurality of support holes.

* * * * *